United States Patent [19]
Itoh

[11] Patent Number: 6,053,012
[45] Date of Patent: Apr. 25, 2000

[54] METHOD FOR MANUFACTURING GLASS PREFORM AND GLASS FIBER

[75] Inventor: Katsuhisa Itoh, Tokyo, Japan

[73] Assignee: Hoya Corporation, Tokyo, Japan

[21] Appl. No.: 09/009,873

[22] Filed: Jan. 21, 1998

[30] Foreign Application Priority Data

Jan. 22, 1997 [JP] Japan ................................ 9-009303

[51] Int. Cl.$^7$ ............................ C03C 3/32; C03C 13/00; C03B 37/075; G02B 6/00
[52] U.S. Cl. .............................. 65/389; 65/429; 65/435; 65/DIG. 15; 65/411; 65/412
[58] Field of Search ............... 65/388, 389, 390, 65/408, 411, 412, 424, 429, 435, DIG. 15

[56] References Cited

U.S. PATENT DOCUMENTS

| | | | |
|---|---|---|---|
| 3,650,598 | 3/1972 | Kitano et al. .............................. | 65/424 |
| 4,631,114 | 12/1986 | Schneider . | |
| 4,749,396 | 6/1988 | Hicks, Jr. .................................. | 65/412 |
| 5,026,409 | 6/1991 | Robinson et al. ......................... | 65/388 |
| 5,108,477 | 4/1992 | Cornelius et al. ................. | 65/DIG. 15 |
| 5,242,476 | 9/1993 | Bartel et al. .............................. | 65/412 |
| 5,651,083 | 7/1997 | Kortan et al. ............................. | 65/389 |

FOREIGN PATENT DOCUMENTS

| | | | |
|---|---|---|---|
| 0 266 889 | 5/1988 | European Pat. Off. . | |
| 0 420 239 | 4/1991 | European Pat. Off. . | |
| 0 484 659 | 5/1992 | European Pat. Off. . | |
| 56-54237 | 5/1981 | Japan ...................................... | 65/388 |
| 57-042551 | 3/1982 | Japan . | |
| 57-42551 | 3/1982 | Japan ...................................... | 65/389 |
| 64-003031 | 1/1989 | Japan . | |
| 1194386 | 6/1970 | United Kingdom . | |
| 2032910 | 5/1980 | United Kingdom .................... | 65/429 |
| 2122599 | 1/1984 | United Kingdom .................... | 65/429 |
| 2 266 524 | 11/1993 | United Kingdom . | |
| 1 401 398 | 7/1995 | United Kingdom . | |

OTHER PUBLICATIONS

Shibata et al., "Ge–P–S Chalcogenide Glass Fibers", Japanese Journal of Applied Physics, pp. 603–605, Oct. 1980.

Muir et al., "GeSeTe—A New Infrared–Transmitting Chalcogenide Glass", Journal of the Optical Society of America, pp. 1–3, Jan. 1967.

Melling, "Alternative Methods of Preparing Chalcogenide Glasses", Ceramic Bulletin, pp. 1427–1429, 1984.

Primary Examiner—Stanley S. Silverman
Assistant Examiner—Michael P. Colaianni
Attorney, Agent, or Firm—Burns, Doane, Swecker & Mathis, L.L.P.

[57] ABSTRACT

A method for manufacturing a glass preform from a metal sulfide chalcogenide glass to which a large amount of light emitting substances can be added includes steps of etching a surface made of the chalcogenide glass or oxychalcogenide glass of disc shape core and clad forming glass starting materials by an etchant including an acid and a compound reacting with a hydrogen chalcogenide, and forming the core forming glass starting material and the clad forming glass starting material into a united body serving as a glass preform. In a method for manufacturing a single-mode glass fiber using a preform method by drawing the glass preform whose outer round surface is made of a chalcogenide glass or oxychalcogenide glass, the outer round surface of the glass preform is etched using an etchant including an acid and a compound reacting with a hydrogen chalcogenide and then drawn into the glass fiber. In another method for manufacturing a glass fiber by drawing a rod-in-tube in which an outer round surface of the rod and inner and outer round surfaces of the tube are made of a chalcogenide glass or oxychalcogenide glass, the round surfaces made of the chalcogenide glass or oxychalcogenide glass are etched by the etchant including an acid and a compound reacting with a hydrogen chalcogenide and then drawn into the glass fiber.

34 Claims, 5 Drawing Sheets

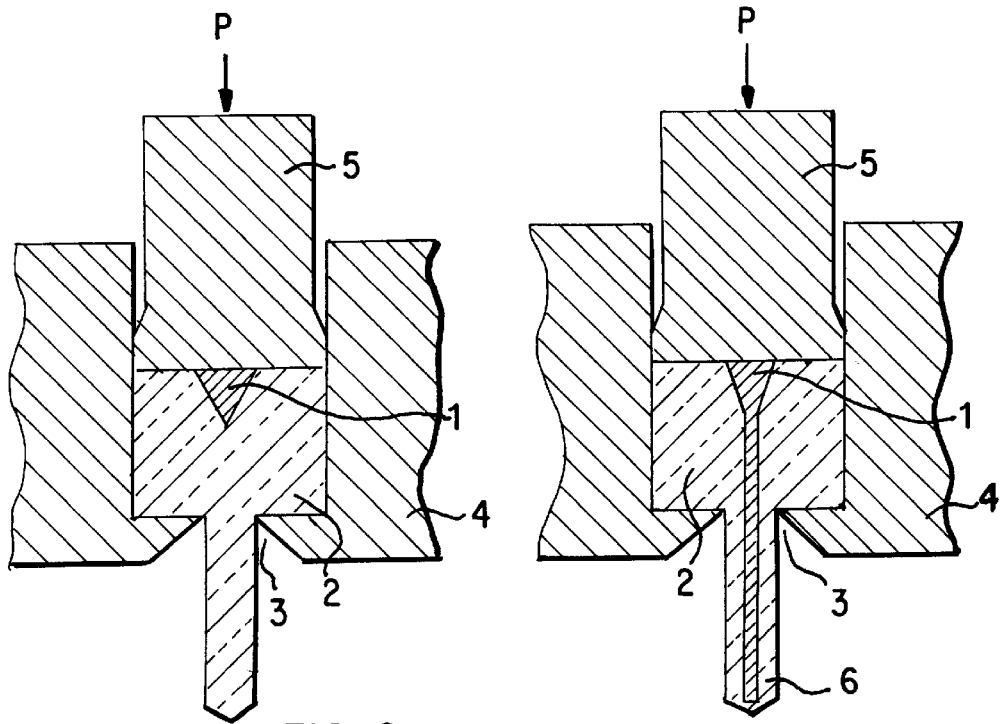
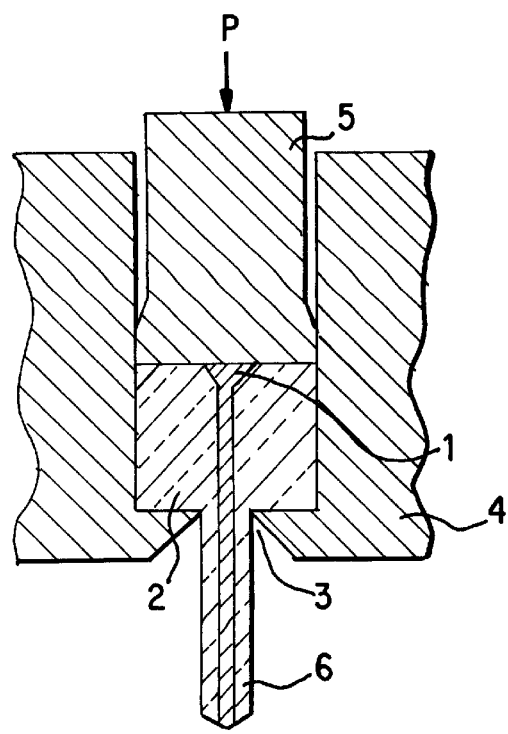

METHOD FOR MANUFACTURING GLASS PREFORM AND GLASS FIBER

BACKGROUND OF THE INVENTION

1. Field of the Invention

This invention relates to a method for manufacturing a glass preform and a glass fiber using a chalcogenide glass or oxychalcogenide glass and to a glass preform and a glass fiber using a chalcogenide glass or oxychalcogenide glass. The glass fiber can contain light emitting substances in the core of the glass fiber and is useful as a fiber for optical amplification. This invention also relates to an optical fiber amplifier.

2. Description of Related Art

In optical telecommunication fields, 1.3-micron band optical amplifiers inexpensive and operational with high efficiency have been desired these days. A 1.3-micron band optical amplification medium currently used is an optical fiber, in the core of which $Pr^{+3}$ ions are added as light emitting substances. A chalcogenide glass is expected to make a host glass to which the $Pr^{+3}$ ions are added. Using such a chalcogenide glass allows makers to create an amplifier having very high efficiency.

To obtain an amplifier having further high efficiency, however, it is required to make sure that the glass contain light emitting substances uniformly while the substances are at an ionic state. The chalcogenide glass generally has property to render the ionic substances as light emitting substances hardly soluble in the chalcogenide glass. We therefore have paid attentions to metal sulfide chalcogenide glasses, constituted essentially of sulfur as a chalcogen element, serving as host glasses surely rendering ionic substances more soluble. Such metal sulfide chalcogenide glasses, because of the high solubility of ionic substances, allow the ionic substances to be doped in a relatively large amount in the glass. The metal sulfide chalcogenide glasses are expected to replace arsenic-sulfuric glasses that are currently manufactured in a large number as chalcogenide glass fibers but have low solubility of ionic substances.

To use the glass as an optical amplifier medium, the glass is required to be fabricated into a form of a single-mode optical fiber. A known method to form the chalcogenide glass into a fiber is a method based on a pot method as disclosed in, e.g., Japanese Unexamined Patent Publication, Showa 64-3,031.

The method disclosed in Japanese Unexamined Patent Publication, Showa 64-3,031, because of the pot method, is not suitable for fabricating a fiber having a core of 15 to 16 micron meters or less in diameter, which is particular for single-mode fibers. Ordinary methods for fabricating a single-mode fiber is a preform method in which a rod-in-tube, or extrusion molding, etc., forms a preform having a larger ratio of a core diameter to a clad diameter and then a part of the preform is heated and softened to make the preform extended.

The metal sulfuric chalcogenide glasses, however, tends to have a lower stability against crystallization than the arsenic-sulfuric glass and may lose mechanical strength of the glass due to foreign objects or latent scratches. When the metal sulfuric chalcogenide glass is drawn into a fiber, the glass surface may be crystallized around the foreign objects or latent scratches as nucleuses on the glass surface, and if crystallized once, the glass is hardly made into a fiber. It was impossible in a practical sense to fabricate an optical fiber in applying a conventional preform method as it was. That is, because in the preform method, at a time of the drawing, a side face of the preform rod or of the jacketing tube makes the side face of the fiber as it is, the fiber's mechanical strength is greatly reduced if foreign objects cling to or latent scratches due to polishing exist on the surface of the preform or tube. Due to this ground, no example has been known in which a practically useful fiber is successfully made by a drawing method, although the sulfuric chalcogenide glass can be doped with a relatively large amount of light emitting substances.

Generally, polishing or etching surfaces is widely used as methods for removing metamorphic layers residing on the glass surfaces and foreign objects clinging to the glass surfaces. Polishing to remove metamorphic layers and foreign objects causes latent scratches, and such latent scratches would unavoidably remain on the surfaces. If foreign objects cling to the glass surfaces or if latent scratches produced due to polishing reside on the glass surfaces, the mechanical strength of the glass would be greatly reduced.

Etching is implemented for removing foreign objects, latent scratches, etc. from the glass surface to form a non-oxide glass having lesser stability of crystallization, e.g., fluoride glass into a fiber. For example, U.S. Pat. No. 4,631,114 discloses removal of metamorphic layers, foreign objects, and latent scratches on a preform or tube surface by etching with a special etchant over the preform or tube surface.

Necessary property of the etchant is: first, the etchant will not increase micro undulation on the glass surface after removing the metamorphic layers, foreign objects, and latent scratches on the glass surface; second, the etchant will not promote latent scratches; and third, the etchant will not create any new metaphoric layer. When etching is made using an etchant dissatisfying those first to third conditions, the strength of the fiber may be deteriorated more than prior to the etching.

A chalcogenide glass, in particular, a sulfide glass, if inadvertently dipped in an etchant including an acid, generates poisonous hydrogen sulfide, etc., in accompanied with solution of the glass, and creates risks. Therefore, an etchant should be designed in the light of compositions of the glass as an etching target.

No etchant has been known so far which satisfies the first to third conditions above and which is designed in consideration of safeness as well. Accordingly, nobody knows a method for forming sulfide chalcogenide glass into a fiber upon removal of foreign objects clinging to or latent scratches created during polishing on the surfaces of the preform rods or jacketing tubes.

As separated from above problems, chalcogenide elements such as sulfur or the like volatilize from the side faces of the preform rods or jacketing tubes directly exposed in a gas phase atmosphere. Particularly, for the sulfuric chalcogenides, such volatilization of sulfur is remarkable.

When the chalcogenide elements such as sulfur and the like volatilize, the surface composition of the preform rods or the jacketing tubes may shift, or become different, from the inside. The metal sulfuric chalcogenide glasses, as described above, have a narrower glass range and inferior stability against crystallization in comparison with the arsenic-sulfuric glasses currently used widely as chalcogenide glasses. If the chalcogenide elements such sulfur and the like volatilize overly from the surfaces of the preform rods and jacketing tubes, compositional shifts at the surface induced by the volatilization cause the surfaces to be very easily crystallized. It is therefore desired, when necessary, to suppress such crystallization caused by the volatilization of the chalcogenide elements, other than foreign objects, etc., clinging to the surfaces.

SUMMARY OF THE INVENTION

It is an object of the invention to provide a method for manufacturing a single-mode fiber by a preform method from a metal sulfuric chalcogenide glass to which a larger amount of light emitting substances can be added.

It is another object of the invention to provide a method for manufacturing a glass fiber by drawing a glass fiber starting material made of a metal sulfuric chalcogenide glass without causing surface crystallization upon safe removal of metamorphic layers, foreign objects, and latent scratches on surfaces of the glass fiber starting material by etching.

It is yet another object of the invention to provide a method for manufacturing a preform for manufacturing a glass fiber on which substantially no foreign object resides at all or some of an outer round surface, a boundary between a core and a clad, and a boundary between the clad and a cover glass of a metal sulfide chalcogenide glass, upon safe removal of metamorphic layers, foreign objects, and latent scratches on glass surfaces by etching.

It is a further object of the invention to provide a glass fiber using a metal sulfide chalcogenide glass having a mechanical strength practically durable and a glass preform using a metal sulfide chalcogenide glass capable of manufacturing such a glass fiber by a drawing method.

It is a still further object of the invention to provide an optical fiber amplifier using a glass fiber made of a metal sulfide chalcogenide glass having a mechanical strength practically durable and containing light emitting substances in a core of the fiber.

In one form of the invention, a method for manufacturing a glass preform formed from disc shape core and clad forming glass starting materials includes the steps of etching a surface made of the chalcogenide glass or oxychalcogenide glass of the glass starting materials by an etchant that includes an acid and a compound reacting with a hydrogen chalcogenide, and forming the core forming glass starting material and the clad forming glass starting material into a united body as the glass preform.

In another form of the invention to manufacture a glass preform, a rod shape glass that is made of a core forming glass and a clad forming glass, and either a disc shape clad forming glass starting material or a cover layer forming glass starting material are formed into a united body after a surface made of a chalcogenide glass or oxychalcogenide glass of the rod shape glass and the glass starting material is etched by an etchant including an acid and a compound reacting with a hydrogen chalcogenide.

In a yet another form of the manufacturing method for a glass preform, the glass preform includes a core forming glass, and a clad forming glass, wherein at least one of the glasses is made of a chalcogenide glass or oxychalcogenide glass, and the glass preform substantially has no foreign object caused by crystallization at a boundary between the core forming glass and the clad forming glass and on an outer round surface of the preform. The glass preform may further include a cover layer forming glass, which can be made of a chalcogenide glass or oxychalcogenide glass, wherein the glass preform also has substantially no foreign object caused by crystallization at a boundary between the clad forming glass and the cover layer forming glass. The core forming glass, according to a preferred embodiment, is made of the chalcogenide glass or oxychalcogenide glass and includes a light emitting substance.

In another aspect of the invention, a method for manufacturing a glass fiber includes the steps of etching a surface made of a chalcogenide glass or oxychalcogenide glass of disc shape core and clad forming glass starting materials by an etchant that includes an acid and a compound reacting with a hydrogen chalcogenide, forming the core and clad forming glass starting materials into a united body; and drawing the united body into the glass fiber. In another form of the invention to manufacture a glass fiber, a rod shape glass that is made of a core forming glass and a clad forming glass, and either a disc shape clad forming glass starting material or a cover layer forming glass starting material are formed into the united body after a surface made of a chalcogenide glass or oxychalcogenide glass is etched by an etchant including an acid and a compound reacting with a hydrogen chalcogenide. The united body is then drawn into the glass fiber.

According to a preferred embodiment, the glass fiber is drawn in an atmosphere containing sulfur, in which the sulfur concentration is controlled at sulfur vapor pressure or above around a glass surface at a maximum temperature while the glass fiber is drawn. The core forming glass or the core forming glass starting material is made of the chalcogenide glass or oxychalcogenide glass and includes a light emitting substance.

In another form of the invention for a method for manufacturing a glass fiber, a glass preform including a core forming glass and a clad forming glass is prepared in having an outer round surface made of a chalcogenide glass or oxychalcogenide glass. The outer round surface of the glass preform is etched by an etchant including an acid and a compound reacting with a hydrogen chalcogenide, and the glass preform is drawn into the glass fiber. The glass preform can be formed by etching a surface made of a chalcogenide glass or oxychalcogenide glass of disc shape core and clad forming glass starting materials using an etchant including an acid and a compound reacting with a hydrogen chalcogenide, and forming the core and clad forming glass starting materials into a united body serving as the glass preform.

Alternatively, for a method for manufacturing a glass fiber, a rod and a tube are prepared in which at least one of an outer round surface of the rod, an inner round surface of the tube, and an outer round surface of the tube is made of a chalcogenide glass or oxychalcogenide glass. One or more round surfaces made of a chalcogenide glass or oxychalcogenide glass among the outer round surface of the rod, the inner round surface of the tube, and the outer round surface of the tube are etched by an etchant including an acid and a compound reacting with a hydrogen chalcogenide, and the rod and the tube are drawn into the glass fiber after placing the rod in a hollow of the tube.

According to a preferred embodiment, the rod is made of a core forming glass starting material, and the tube is made of a clad forming glass starting material. The rod may be a preform made of a core forming glass and a clad forming glass, and the tube may be a jacketing tube made of a cover layer forming glass starting material. The preform is manufactured by etching a surface made of a chalcogenide glass or oxychalcogenide glass of disc shape core and clad forming glass starting materials by an etchant including an acid and a compound reacting with a hydrogen chalcogenide, and forming the core and clad forming glass starting materials into a united body.

In another aspect of the invention, a glass fiber includes a core and a clad, which are partially or entirely made of a chalcogenide glass or oxychalcogenide glass. The glass fiber may further include a cover layer partially or entirely made of the chalcogenide glass or oxychalcogenide glass. The glass fiber substantially has no foreign object caused by crystallization at boundaries between the core and the clad and between the clad and the cover layer and on an outer round surface of the glass fiber. The core may include a light emitting substance.

In a further aspect of the invention, an optical fiber amplifier includes a core partially or entirely made of a chalcogenide glass or oxychalcogenide glass with a light emitting substance, a clad partially or entirely made of the chalcogenide glass or oxychalcogenide glass, and an exciting light source for exciting the light emitting substance in the core, wherein the glass fiber substantially has no foreign object caused by crystallization at a boundary between the core and the clad and on an outer round surface of the glass fiber.

BRIEF DESCRIPTION OF THE DRAWINGS

The above and other objects and features of the invention are apparent to those skilled in the art from the following preferred embodiments thereof when considered in conjunction with the accompanied drawings, in which:

FIGS. 1 and 2(a) to 2(c) are illustrations showing an extruder for implementing a method for manufacturing a glass preform according to the invention;

DETAILED DESCRIPTION OF PREFERRED EMBODIMENTS

A chalcogenide glass or oxychalcogenide glass used in this invention is a metal sulfuric chalcogenide glass. Such a metal sulfuric chalcogenide glass advantageously has a high solubility of ionic substances. The chalcogenide glass is expressed by, e.g., general formula, $A^{3+}$-$D^{2+}$- $E^+$- S, wherein A denotes one or more of Ga, Al, and In; D denotes one or more of Cd, Ca, Sr, Ba, Pb, Zn, and Hg; E denotes one or more of Li, Na, K, Ce, Rb, and Tl. More specifically, exemplified are, e.g., chalcogenide glasses of Ga—Na—S, Ga—Na—Cd—S, Ga—Ge—S, Ga—La—S, B—Na—S, Ga—Ge—La—S, Al—La—S, Ge—Na—S, etc. The oxychalcogenide glass has oxygen in addition to the chalcogenide glass and, more specifically, is made of, e.g., Ga—Na—S—O, Ga—La—S—O, Ga—Ge—La—S—O, Al—La—S—O, etc.

Manufacturing Method for a Glass Preform

The method for manufacturing a glass preform according to the invention renders glasses into a united body by an extrusion molding method and can be classified into the following two major methods. The first method is to unify a disc shape core forming glass starting material and a disc shape clad forming glass starting material into a single body. The second method is to unify a rod shape glass made of a core forming glass and a clad forming glass with either a disc shape clad forming glass starting material or a cover layer forming glass material.

According to the first method, at least one of the core forming glass starting material and the clad forming glass starting material is made of a chalcogenide glass or oxychalcogenide glass. A glass preform is fabricated by forming a disc shape core forming glass starting material and a disc shape clad forming glass starting material using an ordinary method, optically polishing double sides of each disc, and unifying the materials by an extrusion molding after etching described below. Notedly, multiple discs as the clad forming glass starting material can be used for adjusting the clad diameter, and at that time, the double sides of the discs of each clad forming glass starting material are optically polished and etched. Etchants and conditions for etching can be described in details in the following method for manufacturing a glass fiber. Each starting material can be etched in the light of property of the glasses.

Figure 1:
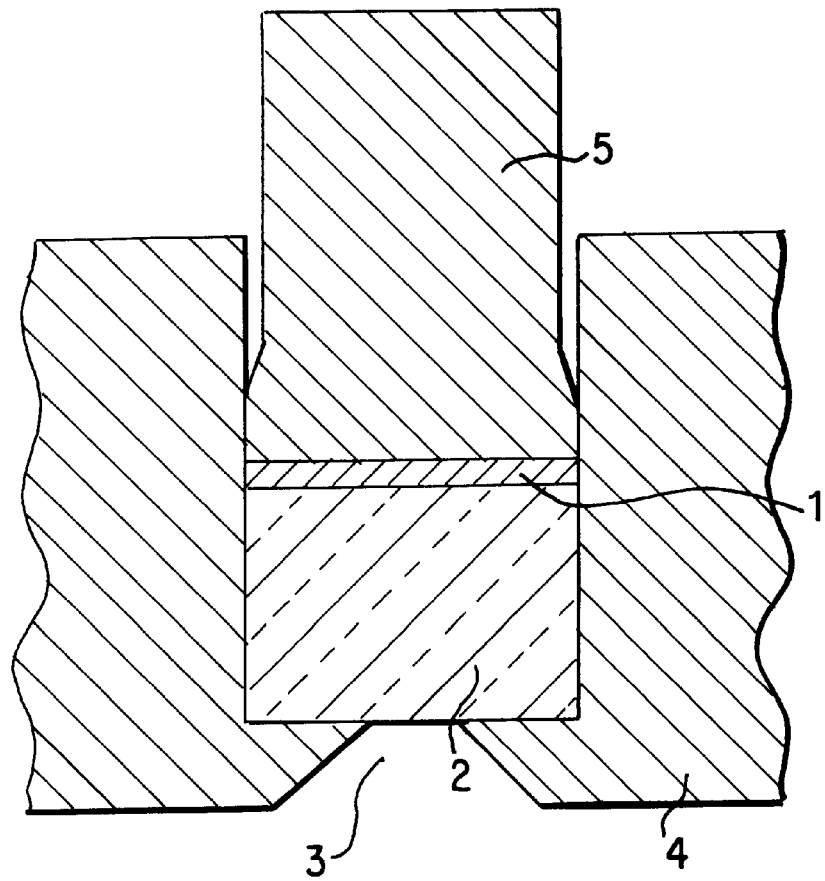

Referring to FIGS. 1, 2, a unification by an extrusion method is described. A disc shape core forming glass starting material 1 and a disc shape clad forming glass starting material 2, adhering to each other with an optical contact, are placed inside a cylinder 4 of an extruder, which includes the cylinder 4 having a molding bore 3 and an extrusion piston head 5. The materials are heated at a temperature capable of molding in a nitrogen atmosphere and produce a preform 6 by application of pressure as shown in FIGS. 2(a) to 2(c).

When the core forming glass starting material is a chalcogenide glass or oxychalcogenide glass, the material is etched and then made into a united body, thereby capable of reducing foreign objects caused by the core forming glass at a boundary between the core forming glass and the clad forming glass in the glass preform to be obtained, and rendering the drawing process easy. When the clad forming glass starting material is a chalcogenide glass or oxychalcogenide glass, the material is etched and then made into a united body, thereby capable of reducing foreign objects caused by the clad forming glass at a boundary between the core forming glass and the clad forming glass in the glass preform to be obtained, and reducing foreign objects on the preform surface. Reduction of foreign objects on the preform surface can suppress further creation of foreign objects on the fiber surface when the obtained preform is drawn, and allows the preform to be drawn easily into a fiber.

According to the second method, at least one of a clad forming glass of a rod shape glass and either a clad forming glass starting material or a cover layer forming glass starting material is a chalcogenide glass or oxychalcogenide glass. The rod shape glass made of a core forming glass and the clad forming glass can be formed by the first method described above. The disc shape clad forming glass starting material and the cover layer forming glass starting material are formed by an ordinary method, and the double sides of the disc are optically polished. The glass preform and the glass disc are made into a united body to form a glass preform by an extrusion molding after an etching process as described below. Etchants and conditions for etching can be described in details in the following method for manufacturing a glass fiber. Each starting material can be etched in the light of property of the glasses.

Figure 3:
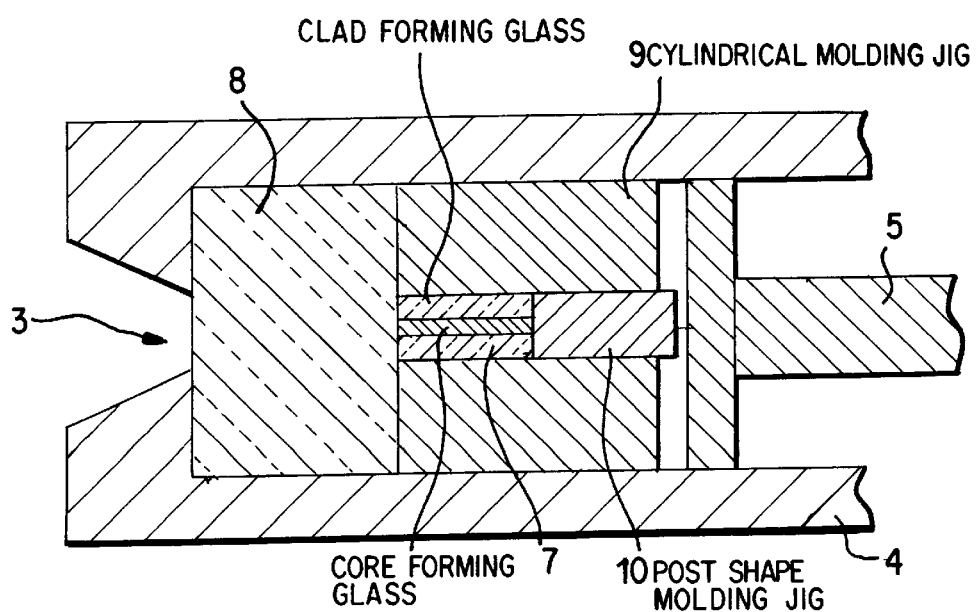
FIGS. 3, 4(a), and 4(b) are illustrations showing an extruder for implementing another method for manufacturing a glass preform according to the invention.
Figure 4A:
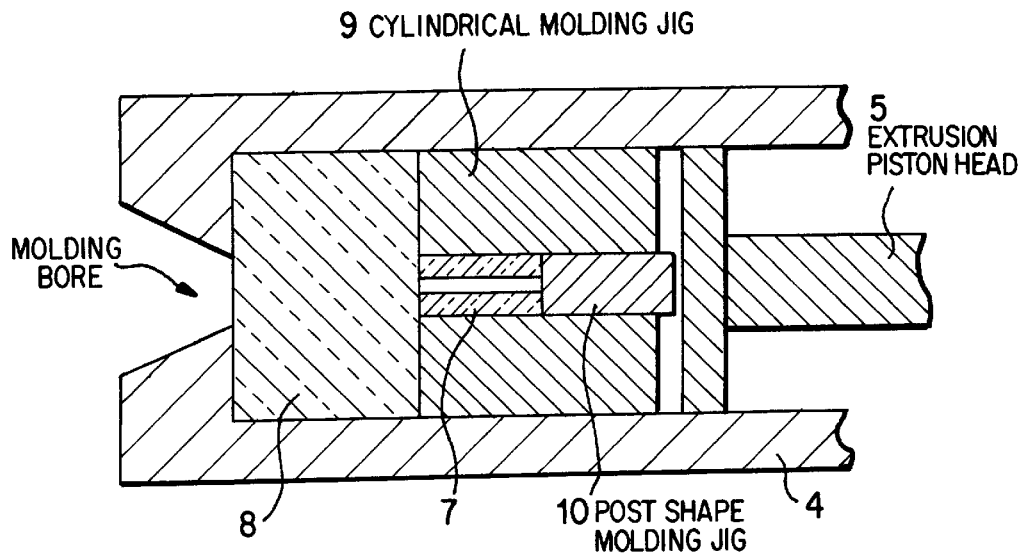
Figure 4B:
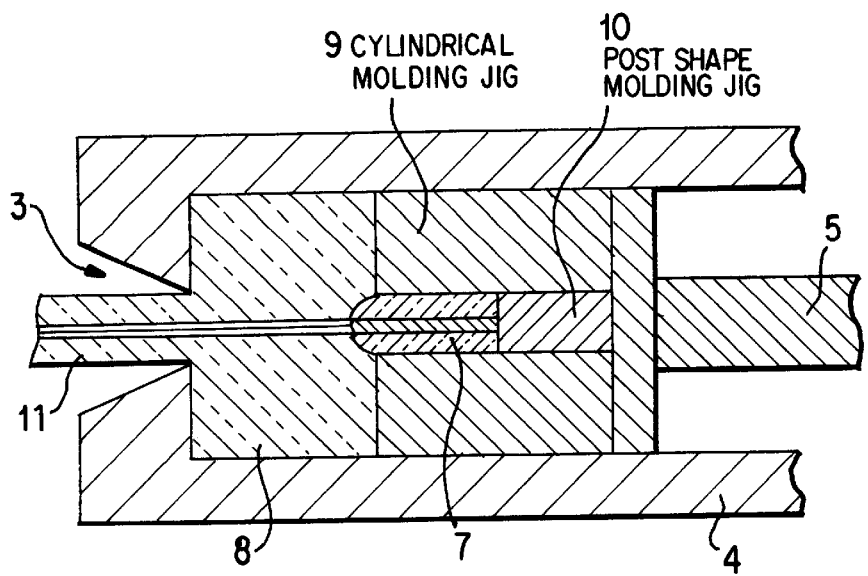

Referring to FIGS. 3, 4, a unification by an extrusion method is described. A rod shape glass preform 7 consisted of a core forming glass and a clad forming glass, and a disc shape clad forming glass starting material 8 are placed using a cylindrical molding jig 9 and a post shape molding jig 10 inside a cylinder 4 of an extruder, which includes the cylinder 4 having a molding bore 3 and an extrusion piston head 5, in substantially the same manner as shown in FIGS. 1, 2. The rod shape glass preform 7 and the disc shape clad forming glass starting material 8 are made to adhere to each other with an optical contact. Subsequently, those materials are heated at a temperature capable of molding in a nitrogen atmosphere and produce a preform 11 by molding with pressure as shown in FIGS. 4(a), 4(b).

When the clad forming glass starting material of the rod shape glass 7 is made of a chalcogenide glass or oxychalcogenide glass, the material is etched and then made into a united body, thereby capable of reducing foreign objects caused by the clad forming glass starting material of the rod shape glass 7 at a boundary between the two clad forming glass layers (a glass layer derived from a clad forming glass of the rod shape glass 7 and a glass layer derived from the clad forming glass starting material 8) and a boundary between the clad forming glass and a cover layer in the glass preform 11 to be obtained, and rendering the drawing process easy. When the clad forming glass starting material or a cover layer forming glass starting material is a chalcogenide glass or oxychalcogenide glass, the material is etched and then made into a united body, thereby capable of reducing foreign objects caused by the clad forming glass starting material 8 at a boundary between the two clad forming glass layers and between the clad forming glass and the cover layer in the glass preform 11 to be obtained, and reducing foreign objects on the preform surface. Reduction of foreign objects on the preform surface can suppress further creation of foreign objects on the fiber surface when the obtained preform is drawn, and allows the preform to be drawn easily into a fiber.

It Is to be noted that the core forming glass starting material is desirably formed of a chalcogenide glass or oxychalcogenide glass, because sulfide chalcogenide glasses and sulfide oxychalcogenide glasses can be doped with light emitting substances in a relatively large amount since having a higher solubility of ionic substances. Moreover, because the sulfide chalcogenide glasses generally have a high light-emitting efficiency of light emitting substances, the core forming glass starting material is desirably made of a chalcogenide glass.

In the case of a clad forming glass and a preform rod made of clad forming glass, the core forming glass of the preform rod and the clad forming glass other than the outermost layer can be made of a glass other than a chalcogenide glass and oxychalcogenide glass. The core forming glass is desirably formed of a chalcogenide glass or oxychalcogenide glass, because sulfide chalcogenide glasses and sulfide oxychalcogenide glasses can be doped with light emitting substances in a relatively large amount since having a higher solubility of ionic substances. Moreover, because the sulfide chalcogenide glasses generally have a high light-emitting efficiency of light emitting substances, the core forming glass is desirably made of a chalcogenide glass.

With any of the first and second methods, the core forming glass of the glass preform can be a material containing a light emitting substance. As light emitting substances, exemplified are, e.g., rare earth elements such as Ce, Pr, Nd, Sm, Eu, Td, Dy, Ho, Er, Tm, Yb, etc., 3d transition metal elements such as Cr, Co, Fe, Ti, etc., and U, etc.

According to the manufacturing method of the invention, the glass preform made of the core forming glass and the clad forming glass or the glass preform made of the core forming glass, the clad forming glass, and the cover layer forming glass, where a part or all of those glasses is made of a chalcogenide glass or oxychalcogenide glass, can be provided in having substantially no foreign object due to crystallization at the boundary between the core forming glass and the clad forming glass, the boundary between the clad forming glass and the cover layer forming glass, and the outer round surface of the preform, and this invention includes the glass preform itself. Having "substantially no foreign object due to crystallization" herein means that no foreign object is observed with the naked eyes.

The glass preform can contain a light emitting substance, while the core forming glass can be made of a chalcogenide glass or oxychalcogenide glass. As light emitting substances, exemplified are, e.g., rare earth elements such as Ce, Pr, Nd, Sm, Eu, Td, Dy, Ho, Er, Tm, Yb, etc., 3d transition metal elements such as Cr, Co, Fe, Ti, etc., and U, etc.

Manufacturing Method for a Glass Fiber

Manufacturing methods according to the invention can be classified into the following two categories. A first method is to draw, into a glass fiber, a glass preform made of a core forming glass and a clad forming glass, whose outer round surface is made of a chalcogenide glass or oxychalcogenide glass. A second method is to draw, into a glass fiber, a rod incorporated in a hollow of a tube, using the rod and tube in which at least one of the outer round surface of the rod, the inner round surface of the tube, and the outer round surface of the tube is made of a chalcogenide glass or oxychalcogenide glass. Hereinafter, the glass preform in the first method, and the rod incorporated in the tube in the second method may be referred to as a glass fiber starting material.

The glass preform used in the first method is a rod having a united body made of the core forming glass and the clad forming glass. The glass preform is made of a chalcogenide glass or oxychalcogenide glass, at least at the outer round surface, or the outermost layer of the clad forming glass. The core forming glass and the clad forming glass other than the outermost layer can be a glass other than the chalcogenide glass or oxychalcogenide glass. The core forming glass is desirably formed of a chalcogenide glass or oxychalcogenide glass, because sulfide chalcogenide glasses and sulfide oxychalcogenide glasses can be doped with light emitting substances in a relatively large amount since having a higher solubility of ionic substances. Moreover, because the sulfide chalcogenide glasses generally have a high light-emitting efficiency of light emitting substances, the core forming glass is desirably made of a chalcogenide glass. The glass preform can be a glass preform manufactured by the manufacturing method according to the invention as described above or a glass preform of the invention.

In the rod incorporated in the hollow of the tube (hereinafter, referred to as "rod-in-tube") used in the second method, for example, the rod is a core forming glass; the tube is a clad forming glass; and the core forming glass rod can be inserted in a hollow of the clad forming glass tube. Alternatively, in the rod-in-tube, for example, the rod is a preform rod made of a core forming glass and a clad forming glass; the tube is a jacketing tube made of a cover layer forming glass; the preform rod can be inserted in the hollow of the jacketing tube.

With the glass fiber starting material made of the rod-in-tube, at least one of the outer round surface of the rod, the inner round surface of the tube, and the outer round surface of the tube is made of the chalcogenide glass or oxychalcogenide glass. When the outer round surface of the rod and/or the inner round surface of the tube is made of the chalcogenide glass or oxychalcogenide glass, etching of those surfaces can suppress production of foreign objects at boundaries between the core and the clad and between the clad and the cover layer in the fiber to be produced and renders the drawing process easy. When the outer round surface of the tube is made of a chalcogenide glass or oxychalcogenide glass, etching of the surface can suppress production of foreign objects on the fiber surfaces during the drawing process and can draw the material into a fiber readily in maintaining mechanical strength of the fiber.

When the glass fiber starting material is a rod-in-tube, the respective members can be etched in the light of property of respective materials of the rod and the tube. For example, when any surface of the rod and tube is made of the chalcogenide glass or oxychalcogenide glass, it is proper to render both of the rod and tube subject to the etching according to the invention. When either of the rod and tube is made of the chalcogenide glass or oxychalcogenide glass, it is proper to render only the portion or portions made of the chalcogenide glass or oxychalcogenide glass subject to the etching according to the invention.

It is to be noted that when the rod is a core forming glass, the core forming glass is desirably formed of a chalcogenide glass or oxychalcogenide glass, because sulfide chalcogenide glasses and sulfide oxychalcogenide glasses can be doped with light emitting substances in a relatively large amount since having a higher solubility of ionic substances. Moreover, because the sulfide chalcogenide glasses generally have a high light-emitting efficiency of light emitting substances, the core forming glass is desirably made of a chalcogenide glass.

When the rod is a preform rod, the core forming glass and the clad forming glass other than the outermost layer of the preform rod can be a glass other than the chalcogenide glass or oxychalcogenide glass. The core forming glass is desirably formed of a chalcogenide glass or oxychalcogenide glass, because sulfide chalcogenide glasses and sulfide oxychalcogenide glasses can be doped with light emitting substances in a relatively large amount since having a higher solubility of ionic substances. Moreover, because the sulfide chalcogenide glasses generally have a high light-emitting efficiency of light emitting substances, the core forming glass is desirably made of a chalcogenide glass.

In any of the first and second methods, the core forming glass of the glass fiber starting material can contain a light emitting substance. As light emitting substances, exemplified are, e.g., rare earth elements such as Ce, Pr, Nd, Sm, Eu, Td, Dy, Ho, Er, Tm, Yb, etc., 3d transition metal elements such as Cr, Co, Fe, Ti, etc., and U, etc.

An etchant used in a manufacturing method according to the invention includes an acid and a compound reacting with hydrogen chalcogenide. The acid can be either an organic acid or an inorganic acid. As an organic acid, exemplified is, e.g., an acetic acid, and as an inorganic acid, exemplified are, e.g., a hydrochloric acid, a nitric acid, a sulfuric acid, and a fluoric acid. A mixture of above acids can be used. An acid, particularly, an inorganic acid is powerful for solving the chalcogenide glass and oxychalcogenide glass. The concentration of the acid is preferably set in the range of 0.01 to 5 N [normals]. When the concentration is lower than that in the range, the etching speed becomes slow, and a thick hydration layer may be formed on the glass surface. In a case of a preform, the hydration layer may promote surface crystallization when the glass is drawn into a fiber. When the concentration is too high, the etching speed becomes too fast, thereby promoting latent scratches and increasing surface roughness.

As a compound reacting with hydrogen chalcogenide, exemplified is, e.g., a compound producing metallic sulfide insoluble in an oxidizing agent or an acid. As a compound producing metallic sulfide insoluble in an acid, exemplified is, e.g., a compound containing a rhodium (Rh). As oxidizing agents, exemplified are, e.g., chlorate, bromate, iodate, hypochlorite, permanganate, chromate, bichromate, hydrogen peroxide, percarbonate, and mixtures of those. It is to be noted that salts constituting those oxidizing agents are preferably salts highly soluble, such as a sodium salt, a potassium salt, etc. In addition to the above compounds, $La(NO_3)_3$, $La(ClO_3)_3$, $BF_3$, and $Ce(BO_2)_4$, $Sn(BO_2)_4$, etc. as compounds of $Ce^{4+}$, $Sn^{4+}$, and $Pb^{4+}$ are exemplified. Those compounds reacting with hydrogen chalcogenide are appropriate to be solved to make a concentration of 0.01 mole per liter or greater. It is to be noted that the upper limit of the concentration is the saturated solubility, and to form a relatively high concentration, it is preferable to select a compound highly soluble in water.

An oxidizing agent has an effect, by quickly oxidizing the gas, to make harmless a hydrogen sulfide gas that produced when the glass is solved in the acid. It is therefore preferable to add the oxidizing agent more than the equivalent amount in accordance with an amount of the glass removed by etching. If an added amount is too small, sulfur is produced in the solution, thereby possibly increasing surface roughness of the member or item to be etched and generating hydrogen sulfide. An excessive additional amount does not raise such problems.

The etchant can further include a compound having property suppressing solution speed in the etchant of at least one type of cations constituting the chalcogenide glass or oxychalcogenide glass. The cations constituting the chalcogenide glass or oxychalcogenide glass can be, as described below, e.g., ions of sodium, gallium, lanthanum, aluminum, etc. The compounds having property suppressing solution speed of those cations in the etchant are, e.g., water-soluble salts capable of increasing the concentration (activity) of cations in the etchant in advance or compounds forming insoluble salts with those cations. As such compounds, exemplified for sodium are, e.g., halide, nitrate, sulfate, borate, phosphate, metaphosphate, uranyl acetate, etc., and for gallium, lanthanum, and aluminum, e.g., halide such as fluoride or the like, nitrate, sulfate, borate, phosphate, and metaphosphate. It is appropriate to use salts containing anions having less reducibility, because those compounds (salts), if containing anions having strong reducibility, may consume the oxidizing agents commonly added.

The compound has an effect to selectively prevent specific ion species from solving out of the glass. Therefore, if with respect to a glass containing a large amount of sodium ions, a compound having property suppressing solution speed of sodium ions in the etchant is used or if with respect to a glass containing gallium, aluminum, etc., as main components, a compound having property suppressing solution speed of the gallium and aluminum ions in the etchant is used, those ions would be prevented from solving out of the glass. A proper range of the additional amount of those compounds to the etchant is generally from 0.01 mole per liter to the saturated concentration, though an optimum amount may vary according to glass species and composition ratios.

The compound reacting with hydrogen chalcogen can be a salt. A cation constituting the salt can have property suppressing solution speed of at least one type of the cations constituting chalcogenide glass or oxychalcogenide glass in the etchant. As such a compound, exemplified are sodium chlorate, gallium chlorate, aluminum chlorate, sodium bromate, gallium bromate, aluminum bromate, sodium iodate, gallium iodate, aluminum iodate, sodium hypochlorite, gallium hypochlorite, aluminum hypochlorite, sodium permanganate, gallium permanganate, aluminum permanganate, sodium chromate, gallium chromate, aluminum chromate, sodium bichromate, gallium bichromate, aluminum bichromate, sodium hydrogen peroxide, gallium hydrogen peroxide, aluminum hydrogen peroxide, sodium percarbonate, gallium percarbonate, aluminum percarbonate, etc. A proper range of an additional amount of those compounds to the etchant is generally from 0.01 mole per liter to the saturated concentration.

The etchant can contain other additives in addition to the above compositions. For example, to control the viscosity of the etchant, viscosity controlling agents such as glycerol, sodium silicate, polyvinyl alcohol, calcium sulfate, tetramethoxysilane, trimethoxysilane, tetraethoxysilane, etc., can be added to the etchant.

When the sulfide glass is etched in use of the etchant, the hydrogen chalcogenide generated by reaction of the acid is hydrogen sulfide, and this hydrogen sulfide reacts with "the compound reacting with hydrogen chalcogenide," so that poisonous hydrogen sulfide will not leak out of the process line.

Tables 1A to 5B show combinations of kinds of chalcogenide glasses and oxychalcogenide glasses, as etching targets, and etchants suitable in accordance with kinds of the respective glasses. The etchants here include an acid, a compound (oxidizing agent) reacting with hydrogen chalcogenide, and a compound having property suppressing solution speed of at least one type of cations constituting the chalcogenide glass or oxychalcogenide glass.

TABLE 1A

Glass: Ga—Na—S, Acid: Hydrochloric Acid or Nitric Acid

|  | Sodium Chlorate | Sodium Bromate | Sodium Iodate | Sodium Hypochlorite |
| --- | --- | --- | --- | --- |
| Sodium Bromide | Yes | Yes | Yes | Yes |
| Sodium Iodide | Yes | Yes | Yes | Yes |
| Sodium Nitrate | Yes | Yes | Yes | Yes |
| Sodium Sulfate | Yes | Yes | Yes | Yes |
| Sodium Borate | Yes | Yes | Yes | Yes |
| Sodium Orthophosphate | Yes | Yes | Yes | Yes |
| Sodium Metaphosphate | Yes | Yes | Yes | Yes |
| Sodium Bromide + Gallium Chloride | Yes | Yes | Yes | Yes |
| Sodium Iodide + Gallium Chloride | Yes | Yes | Yes | Yes |
| Sodium Nitrate + Gallium Nitrate | Yes | Yes | Yes | Yes |
| Sodium Sulfate + Gallium Nitrate | Yes | Yes | Yes | Yes |
| Sodium Borate + Gallium Borate | Yes | Yes | Yes | Yes |

TABLE 1B

Glass: Ga—Na—S, Acid: Hydrochloric Acid or Nitric Acid

|  | Potassium Permanganate | Potassium Chromate | Potassium Bichromate | Hydrogen Peroxide | Sodium Percarbonate |
|---|---|---|---|---|---|
| Sodium Bromide | Yes | Yes | Yes | Yes | Yes |
| Sodium Iodide | Yes | Yes | Yes | Yes | Yes |
| Sodium Nitrate | Yes | Yes | Yes | Yes | Yes |
| Sodium Sulfate | Yes | Yes | Yes | Yes | Yes |
| Sodium Borate | Yes | Yes | Yes | Yes | Yes |
| Sodium Orthophosphate | Yes | Yes | Yes | Yes | Yes |
| Sodium Metaphosphate | Yes | Yes | Yes | Yes | Yes |
| Sodium Bromide + Gallium Chloride | Yes | Yes | Yes | Yes | Yes |
| Sodium Iodide + Gallium Chloride | Yes | Yes | Yes | Yes | Yes |
| Sodium Nitrate + Gallium Nitrate | Yes | Yes | Yes | Yes | Yes |
| Sodium Sulfate + Gallium Nitrate | Yes | Yes | Yes | Yes | Yes |
| Sodium Borate + Gallium Borate | Yes | Yes | Yes | Yes | Yes |

Note:
Nitric or sulfuric acid is preferably used for oxidizing agents having relatively strong oxidative ability such as potassium permanganate, potassium chromate, and potassium bichromate.

TABLE 2A

Glass: Ga—Na—S—(O), Acid: Hydrochloric Acid, Nitric Acid, Sulfuric Acid, Fluoric Acid, or Acetic Acid

|  | Sodium Chlorate | Sodium Bromate | Sodium Iodate | Sodium Hypochlorite |
|---|---|---|---|---|
| Sodium Bromide | Yes | Yes | Yes | Yes |
| Sodium Iodide | Yes | Yes | Yes | Yes |
| Sodium Nitrate | Yes | Yes | Yes | Yes |
| Sodium Sulfate | Yes | Yes | Yes | Yes |
| Sodium Borate | Yes | Yes | Yes | Yes |
| Sodium Orthophosphate | Yes | Yes | Yes | Yes |
| Sodium Metaphosphate | Yes | Yes | Yes | Yes |
| Sodium Bromide + Gallium Chloride | Yes | Yes | Yes | Yes |
| Sodium Iodide + Gallium Chloride | Yes | Yes | Yes | Yes |
| Sodium Nitrate + Gallium Nitrate | Yes | Yes | Yes | Yes |
| Sodium Sulfate + Gallium Nitrate | Yes | Yes | Yes | Yes |
| Sodium Borate + Gallium Borate | Yes | Yes | Yes | Yes |

TABLE 2B

Glass: Ga—Na—S—(O), Acid: Hydrochloric Acid, Nitric Acid, Surfuric Acid, Fluoric Acid, or Acetic Acid

|  | Potassium Permanganate | Potassium Chromate | Potassium Bichromate | Hydrogen Peroxide | Sodium Percarbonate |
|---|---|---|---|---|---|
| Sodium Bromide | Yes | Yes | Yes | Yes | Yes |
| Sodium Iodide | Yes | Yes | Yes | Yes | Yes |
| Sodium Nitrate | Yes | Yes | Yes | Yes | Yes |
| Sodium Sulfate | Yes | Yes | Yes | Yes | Yes |
| Sodium Borate | Yes | Yes | Yes | Yes | Yes |
| Sodium Orthophosphate | Yes | Yes | Yes | Yes | Yes |
| Sodium | Yes | Yes | Yes | Yes | Yes |

TABLE 2B-continued

Glass: Ga—Na—S—(O), Acid: Hydrochloric Acid, Nitric Acid, Surfuric Acid, Fluoric Acid, or Acetic Acid

|  | Potassium Permanganate | Potassium Chromate | Potassium Bichromate | Hydrogen Peroxide | Sodium Percarbonate |
|---|---|---|---|---|---|
| Metaphosphate |  |  |  |  |  |
| Sodium Bromide + Gallium Chloride | Yes | Yes | Yes | Yes | Yes |
| Sodium Iodide + Gallium Chloride | Yes | Yes | Yes | Yes | Yes |
| Sodium Nitrate + Gallium Nitrate | Yes | Yes | Yes | Yes | Yes |
| Sodium Sulfate + Gallium Nitrate | Yes | Yes | Yes | Yes | Yes |
| Sodium Borate + Gallium Borate | Yes | Yes | Yes | Yes | Yes |

Note:
Nitric or sulfuric acid is preferably used for oxidizing agents having relatively strong oxidative ability such as potassium permanganate, potassium chromate, and potassium bichromate.

TABLE 3A

Glass: Ga—La—S—(O), Acid: Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Bromide + Lanthanum Chloride | Yes | Yes | Yes | Yes |
| Gallium Iodide + Lanthanum Chloride | Yes | Yes | Yes | Yes |
| Gallium Nitrate + Lanthanum Nitrate | Yes | Yes | Yes | Yes |
| Gallium Sulfate + Lanthanum Nitrate | Yes | Yes | Yes | Yes |
| Gallium Borate + Lanthanum Borate | Yes | Yes | Yes | Yes |

TABLE 3B

Glass: Ga—La—S—(O), Acid: Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |
| Gallium Metaphosphate | Yes | Yes | Yes | Yes | Yes |
| Gallium Bromide + Lanthanum Chloride | Yes | Yes | Yes | Yes | Yes |
| Gallium Iodide + Lanthanum Chloride | Yes | Yes | Yes | Yes | Yes |

TABLE 3B-continued

Glass: Ga—La—S—(O), Acid: Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Nitrate + Lanthanum Nitrate | Yes | Yes | Yes | Yes | Yes |
| Gallium Sulfate + Lanthanum Nitrate | Yes | Yes | Yes | Yes | Yes |
| Gallium Borate + Lanthanum Borate | Yes | Yes | Yes | Yes | Yes |

Note:
Nitric or sulfuric acid is preferably used for oxidizing agents having relatively strong oxidative ability such as potassium permanganate, potassium chromate, and potassium bichromate.

TABLE 4A

Glass: Ga—La—S—(O), Acid: Fluoric Acid, Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Fluoride | Yes | Yes | Yes | Yes |
| Gallium Nitrate + Sodium Fluoride | Yes | Yes | Yes | Yes |

TABLE 4B

Glass: Ga—La—S—(O), Acid: Fluoric Acid, Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |
| Gallium Metaphosphate | Yes | Yes | Yes | Yes | Yes |
| Gallium Fluoride | Yes | Yes | Yes | Yes | Yes |
| Gallium Nitrate + Sodium Fluoride | Yes | Yes | Yes | Yes | Yes |

Note: Nitric or sulfuric acid is preferably used for oxidizing agents having relatively strong oxidative ability such as potassium permanganate, potassium chromate, and potassium bichromate.

TABLE 5A

Glass: Ga—Ge—La—S—(O), Acid: Fluoric Acid, Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Fluoride | Yes | Yes | Yes | Yes |
| Gallium Nitrate + Sodium Fluoride | Yes | Yes | Yes | Yes |
| Gallium Nitrate + | Yes | Yes | Yes | Yes |

TABLE 5A-continued

Glass: Ga—Ge—La—S—(O), Acid: Fluoric Acid, Hydrochloric Acid, Nitric Acid, Sulfuric Acid, or Acetic Acid

| | Sodium Chlorate | Sodium Bromate | Sodium Iodate | Sodium Hypochlorite |
|---|---|---|---|---|
| Lanthanum Nitrate | | | | |
| Gallium Nitrate + Lanthanum Nitrate + Gallium Fluoride | Yes | Yes | Yes | Yes |
| Gallium Borate + Lanthanum Borate + Gallium Fluoride | Yes | Yes | Yes | Yes |

TABLE 5B

Glass: Ga—Ge—La—S—(O), Acid: Fluoric Acid, Hydrochloric Acid, Nitric Acid, Sulfuric Acid, or Acetic Acid

| | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |
| Gallium Metaphosphate | Yes | Yes | Yes | Yes | Yes |
| Gallium Fluoride | Yes | Yes | Yes | Yes | Yes |
| Gallium Nitrate + Sodium Fluoride | Yes | Yes | Yes | Yes | Yes |
| Gallium Nitrate + Lanthanum Nitrate | Yes | Yes | Yes | Yes | Yes |
| Gallium Nitrate + Lanthanum Nitrate + Gallium Fluoride | Yes | Yes | Yes | Yes | Yes |
| Gallium Borate + Lanthanum Borate + Gallium Fluoride | Yes | Yes | Yes | Yes | Yes |

The surfaces made of at least the chalcogenide glass or oxychalcogenide glass of the glass fiber starting material is dipped in the etchant above. The surfaces can be dipped in the etchant having liquid temperature of 1 to 50 Celsius degrees for 0.1 to 3600 seconds. The temperature and time for dipping can be selected in the light of the compositions of the etchant and the glass compositions constituting the glass fiber starting material.

After etching, excessive etchant is completely removed from the surface by rinsing the surface with organic solvents such as alcohol or ketone group after rinsing with, e.g., pure water, or by directly rinsing the surface with organic solvents such as alcohol or ketone group, and then the surface can be dried in dry air or inert gas. The etching can remove latent scratches even where the glass has, e.g., latent scratches on the glass surface due to polishing.

The glass fiber starting material thus etched is subsequently drawn into a fiber. A conventional apparatus and conditions for drawing the glass fiber starting material can be used as they are. For example, the glass fiber starting material can be fabricated into a glass fiber by drawing the glass fiber starting material in applying heat to soften the material. More specifically, a part of the glass fiber starting material can be so drawn in applying heat that the glass viscosity becomes, e.g., $1 \times 10^5$ to $1 \times 10^{7.5}$ poises.

The drawing process in the method according to the invention is preferably implemented under an atmosphere containing sulfur of a concentration of sulfur's vapor pressure or greater around a glass surface at glass' maximum temperature during the drawing process. Sulfur's volatilization speed from the glass surface becomes slower, and sulfur becomes less volatile, as the sulfur's vapor pressure in the gas phase in contact with the glass surface becomes higher. Accordingly, if the sulfur's vapor pressure in the atmosphere is controlled to be the sulfur's vapor pressure around the glass surface at the maximum temperature that the glass fiber starting material receives during the drawing, sulfur's volatilization from the glass surface can be substantially reduced. Although there would be no upper limit in the sulfur's vapor pressure, it would be unnecessary to make the sulfur's vapor pressure excessively high to suppress sulfur's volatilization, and if the sulfur's vapor pressure becomes too high, handling of the atmosphere would become harder to that extent. Therefore, an appropriate pressure of sulfur in the atmosphere would, in a practical sense, be equal to or greater than the sulfur's vapor pressure as well as close to the sulfur's vapor pressure.

As a source of sulfur, sulfur itself and a sulfuric compound, such as hydrogen sulfide, containing sulfur to create sulfur upon decomposition can be used. From a viewpoint to control sulfur's vapor pressure (concentration) in the atmosphere, it is desirable to use sulfur or hydrogen sulfide. When sulfur is used, the vapor pressure of sulfur (concentration) in the atmosphere can be controlled by properly diluting sulfur with inert gas or gases or the like in consideration of the maximum temperature that the glass fiber starting material receives during drawing. A sulfuric vapor (gas) of 0.01 to 100% or a mixture gas of a sulfuric vapor (gas) and an inert gas (rare gas and nitrogen gas) can be used.

When a hydrogen sulfide is used, the concentration of the hydrogen sulfide to be supplied is controlled in consideration of the maximum temperature that the glass fiber starting material receives during drawing, because the hydrogen sulfide is thermally decomposed at and above about 400 degrees Celsius and provides a vapor pressure of sulfur according to the temperature. The sulfur's vapor pressure (concentration) can be therefore controlled to a desired value in the atmosphere. That is, the concentration of hydrogen sulfide to be supplied to the atmosphere can be determined in the light of temperature. A hydrogen sulfide gas of, e.g., 0.01 to 100% or a mixture gas of a hydrogen sulfide and an inert gas (rare gas and nitrogen gas) can be used. Moreover, a mixture gas of a hydrogen sulfide, sulfur, and an inert gas can be used as an atmosphere gas. When a hydrogen sulfide is used or mixed in the atmosphere, it is preferable to decompose a part of the hydrogen sulfide by increasing the part to a temperature of 400 degrees Celsius or greater in advance.

When a hydrogen sulfide is used or mixed as a sulfur source, an oxidizing gas can be added together with the hydrogen sulfide for the purpose of promotion of sulfur supply by decomposition of the hydrogen sulfide and traps of the hydrogen gas (which indicates strong reducibility and may crystallize the glass) produced by the decomposition. As an oxidizing gas, exemplified are, e.g., oxygen, sulfur dioxide, sulfur trioxide, $POCl_3$, $SOCl_3$, halogen gas, sulfur hexafluoride, nitrogen dioxide, nitrogen monoxide, etc. It is appropriate to set the oxidizing gas to be 50 percent or less of the gas supply.

The hydrogen sulfide gas, even if solely used, can continue to supply sulfur element onto the glass surface by reacting with the glass surface or being decomposed around the glass surface in a way as shown in the following formula:

$H_2S \rightarrow H_2 + S$.

According to glass species, however, strong reduction power of the hydrogen gas produced by the reaction above reduces metal ions having easily reducible property among glass constituting elements. As a result, the glass may rapidly lose the stability against crystallization due to changes of glass constituting ions, thereby possibly causing crystallization. To solve this problem, it is preferred to render the atmosphere gas coexist with the oxidizing gas, as described above, thereby rendering the hydrogen an inert compound (water).

By setting the concentration of sulfur in the atmosphere to sulfur's vapor pressure or greater around the glass surface at the maximum temperature of the glass during the drawing as described above, volatilization of sulfur element from the glass surface of the preform rod or jacketing tube can be suppressed. Consequently, composition shifts otherwise induced due to volatilization of sulfur element will be prevented, so that a glass fiber can be fabricated without deposition of crystals on the glass surface.

It is to be noted that some glass species do not reach a temperature such that hydrogen sulfide is decomposed to sufficiently supply sulfur element, or in other words, some glass species have a relatively low drawing temperature. For those glasses, it is desirable to premix the glasses with oxidizing gas capable of oxidizing hydrogen sulfide at around ordinary temperature, e.g., sulfur dioxide or the like, or to sufficiently decompose the hydrogen sulfide by heating the hydrogen sulfide itself in advance. An appropriate oxidizing gas such as sulfur dioxide has a concentration of 100 ppm to 50 mole percent (the same amount as hydrogen sulfide). When a hydrogen sulfide itself is preheated to be decomposed, it is proper that the temperature is 400 degrees Celsius or greater.

Figure 5:
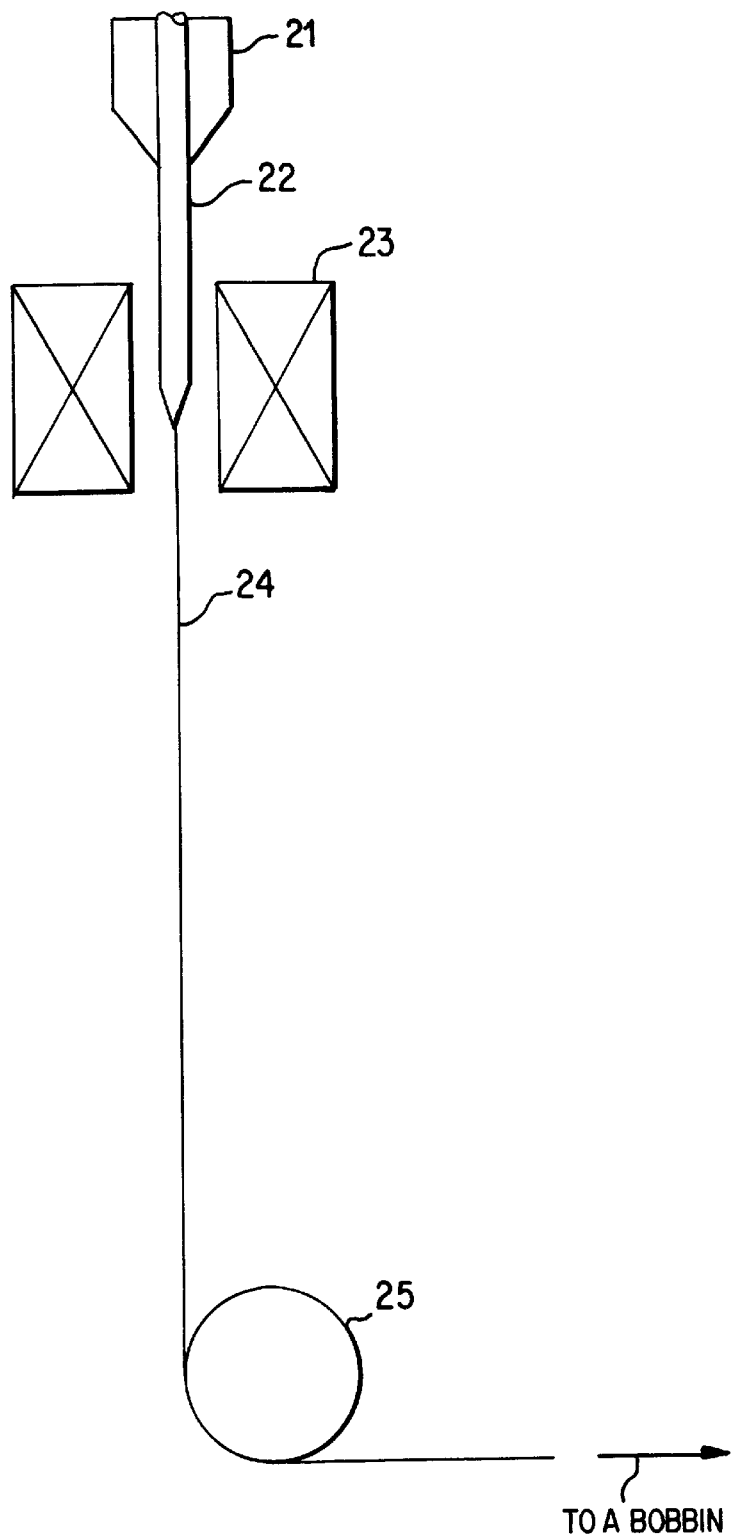
FIG. 5 is an illustration showing a drawing apparatus for optical fiber for implementing a method for manufacturing a glass preform according to the invention.

The drawing can be implemented with a furnace at least capable of controlling an inside atmosphere and an apparatus basically having a mechanism to extract the glass softened by heat. For example, as shown in FIG. 5, a drawing furnace 23 applies heat to a tip of a preform 22 mounted on a preform chuck 21. A capstan 25 draws an optical fiber 24 from the tip of the preform 22, and the drawn optical fiber 24 is taken up by a bobbin, not shown, thereby forming the optical fiber 24. Though not shown, the drawing furnace 23 has a structure capable of controlling the inside atmosphere.

According to the manufacturing method of the invention, the glass fiber made of the core and the clad where a part or all of the core and clad is made of a chalcogenide glass or oxychalcogenide glass, can be provided having substantially no foreign object due to crystallization at the boundary between the core and the clad and on the outer round surface of the fiber. The glass fiber made of the core, the clad, and the cover layer where a part or all of the core, the clad, and the cover layer is made of a chalcogenide glass or oxychalcogenide glass, can be provided having substantially no foreign object due to crystallization at the boundary between the core and the clad and between the clad and the cover layer and on the outer round surface of the fiber. This invention includes the glass fiber itself.

As the glass fiber made of the core and the clad where a part or all of the core and clad is made of a chalcogenide glass or oxychalcogenide glass, exemplified is, e.g., a fiber in which either or both of the core and clad are made of the chalcogenide glass or oxychalcogenide glass. The glass fiber made of the core, the clad, and the cover layer where a part or all of the core and clad is made of a chalcogenide glass or oxychalcogenide glass, exemplified is, e.g., a fiber in which the core, the clad, the cover layer, the core and clad, the core and cover layer, the clad and cover layer, or the core, the clad, and the cover layer are made of the chalcogenide glass and oxychalcogenide glass.

Having "substantially no foreign object due to crystallization" herein means that when the number of foreign objects due to crystallization is counted in a longitudinal direction of the fiber for a prescribed distance, the value of the counted number divided by the prescribed distance is one particle per meter or less. Such counting operation of the number of foreign objects can be performed by using a microscope or the like.

The glass fiber can contain light emitting substances. As light emitting substances, exemplified are, e.g., rare earth elements such as Ce, Pr, Nd, Sm, Eu, Td, Dy, Ho, Er, Tm, Yb, etc., 3d transition metal elements such as Cr, Co, Fe, Ti, etc., and U, etc.

This invention includes the glass fiber described above, and an optical fiber amplifier having exciting light source for exciting light emitting substances contained in the core of the glass fiber. The glass fiber may be a fiber performing for a single-mode according to the wavelength of a signal light. The fiber contains light emitting substances in the core of the fiber. The above substances can be exemplified as the light emitting substances. The concentration of the light emitting substances can be determined according to capability of the amplifier. For example, $Pr^{3+}$ can be in a range of 500 to 5000 ppm, preferably 500 to 4000 ppm; $Er^{3+}$ can be in a range of 100 to 10000 ppm, preferably 1000 to 3000 ppm; $Dy^{3+}$ can be in a range of 100 to 10000 ppm, preferably 1000 to 10000 ppm.

The exciting light source can be selected from known light sources according to the light emitting substances contained in the core. For example, a semiconductor laser (oscillation wavelength 800 nanometers, 0.98 micrometer, 1.02 micrometers, 1.48 micrometers), a semiconductor laser (abbreviation:MOPA) having a structure integrating a semiconductor laser and an amplifier on a chip, a $Ti^{3+}$ sapphire laser (oscillation wavelength 1.0 micrometer), a $Nd^{3+}$ YAG laser (oscillation wavelength 1.06 micrometers), a $Nd^{3+}$ YLF laser (oscillation wavelength 1.047 micrometers), a $Yb^{3+}$ fiber laser (oscillation wavelength 1 micrometer band), a $Yb^{3+}$ YAG laser (oscillation wavelength 1 micrometer band), etc. are exemplified. The intensity of the light source can be in a range of, e.g., 50 or 60 to 500 or 600 milliwatts according to usage and performance.

The optical fiber amplifier according to the invention can be formed together with an optical multiplexer integrating an exciting light with a pre-amplified signal light, an optical demultiplexer separating the exciting light with a postamplified signal light, an isolator preventing reflected light from returning into the optical fiber from the output side, an optical circulator, a fiber grating, etc.

In the case of a conventional optical fiber amplifier whose light emitting substance is $Pr^{3+}$, the optical amplification gain efficiency was about 0.2 dB/W in a fluoride glass ZBLAN and about 0.4 dB/W in an indium system glass. To the contrary, in the case of an optical fiber amplifier using a chalcogenide glass according to the invention, an optical amplification gain efficiency is about 0.8 dB/W.

Any optical fiber amplifier using $Dy^{3+}$ as light emitting substances was unknown so far. An optical fiber amplifier using a chalcogenide glass or oxychalcogenide glass according to the invention can obtain an optical amplification in use of $Dy^{3+}$ as light emitting substances, and particularly, when the glass fiber is made of a chalcogenide glass, the amplifier can obtain a high light emitting efficiency.

EXAMPLES

Hereinafter, this invention will be described based on Examples.

Example 1

A core-clad united body type preform rod made of sulfuric chalcogenide glass having a clad composition of 67 mole percent $Ga_2S_3$ and 33 mole percent $Na_2S$, an outer diameter of 6 millimeters, and a length of 30 millimeters was fabricated by an extrusion molding method.

An etchant according to the invention was prepared by solving sodium chloride of 550 grams and potassium chlorate of 20 grams in this order in one liter hydrochloric acid of 0.1 mole per liter. The glass preform rod was dipped in the etchant while rotated, and then etched at the room temperature (20 Celsius degrees) for five minutes. The glass preform rod was subsequently rinsed with water of zero Celsius degree for about one second and washed in an acetone for about one minute in applying ultrasound, and then dried in a dry air.

Although foreign objects of about ten pieces per square millimeter (or 1000 pieces per square centimeter) due to crystallization were observed on the glass preform surface under an observation using an optical microscope prior to the etching, no foreign object was observed on the glass perform surface after the etching. When the glass preform rod was etched solely with hydrochloric acid of 0.1 mole per liter, an interference film assuming blue color was produced on the glass surface, and an occurrence of a composition shift was apparently observed on the glass surface.

The etched preform rod was drawn at a temperature of 545 degrees Celsius in a nitrogen atmosphere, and a glass fiber was obtained. No foreign object due to crystallization was observed on the surface of the obtained glass fiber.

Example 2

With the same conditions as Example 1, except that drawing is implemented in an atmosphere containing sulfur, a glass fiber is fabricated. That is, the etched preform rod was placed in a drawing furnace capable of controlling the atmosphere, and nitrogen gas containing a hydrogen sulfide of 20 percent on a volume basis was flowed from a top of a set of the rod and the tube at a flow rate of 0.5 liter per minute. Subsequently, where the drawing furnace was heated as the mixture gas was still flowed, the preform rod was drawn at about a temperature of 545 degrees Celsius, a fiber could be drawn without creating any crystallization on the surface of the fiber.

Example 3

A sulfide chalcogenide glass tube having a glass composition of 65 mole percent $Ga_2S_3$ and 35 mole percent $Na_2S$ and an outer diameter of 10 millimeters and an inner diameter of 7 millimeters, was fabricated by a rotational casting method, and the outside surface was polished anhydrously and etched. An etchant was prepared by solving sodium chloride of 510 grams and sodium chlorate of 50 grams in this order in one liter hydrochloric acid of 0.05 mole per liter. The glass tube thus polished anhydrously was dipped in the etchant while rotated, and then etched at the room temperature (20 Celsius degrees) for five minutes. The glass tube was subsequently rinsed with 99.5 percent ethanol of 20 Celsius degree for about one second in applying ultrasound and washed in an acetone for about one minute, and then dried in a dry air.

A sulfide chalcogenide glass core rod having a glass composition of 67 mole percent $Ga_2S_3$ and 33 mole percent $Na_2S$ and an outer diameter of 6.8 millimeters, was fabricated by a casting molding method, and the outside surface was polished anhydrously and etched. The obtained rod was etched in the same manner as above.

Although foreign objects of about ten pieces per square millimeter (or 1000 pieces per square centimeter) due to crystallization were observed on the glass preform surface under an observation using an optical microscope prior to the etching, no foreign object was observed on the glass preform surface after the etching. When the glass preform rod was etched solely with hydrochloric acid of 0.1 mole per liter, an interference film assuming blue color was produced on the glass surface, and an occurrence of a composition shift was apparently observed on the glass surface.

The etched preform rod was drawn at a temperature of 545 degrees Celsius in a nitrogen atmosphere as in Example 1 or an atmosphere containing sulfur as in Example 2, and a glass fiber was obtained. No foreign object due to crystallization was observed on the surface of the obtained glass fiber and at the boundary between the core and the clad, with respect to each atmosphere.

Example 4

A core-clad united body type sulfide chalcogenide glass preform rod having a clad glass composition of 70 mole percent $Ga_2S_3$ and 30 mole percent $La_2S$ and an outer diameter of 6 millimeters, was fabricated by a extrusion molding method and was polished anhydrously and etched. An etchant was prepared by metal gallium of 140 grams and potassium permaganate of 50 grams in this order in one liter nitric acid of 3 mole per liter. The glass preform rod thus polished anhydrously was dipped in the etchant while rotated, and then etched at the room temperature (20 Celsius degrees) for five minutes. The glass preform rod was subsequently rinsed with 99.5 percent ethanol of 20 Celsius degree for about one second in applying ultrasound and washed in an acetone for about one minute, and then dried in a dry air.

Although an interference film assuming blue color was produced on the glass surface when the glass rod thus polished was etched solely with nitric acid of 1 mole per liter, no interference film was observed after the etching. No foreign object due to crystallization was observed on the surface of the glass after the etching, and no latent scratch was observed either.

The etched preform rod was drawn at a temperature of 660 degrees Celsius in a nitrogen atmosphere as in Example 1 or an atmosphere containing sulfur as in Example 2, and a glass fiber was obtained. No foreign object due to crystallization was observed on the surface of the obtained glass fiber, with respect to each atmosphere.

Example 5

A core-clad united body type sulfide chalcogenide glass preform rod having a clad composition of 5 mole percent Ga, 25 mole percent Ge, and 70 mole percent S and an outer diameter of 6 millimeters, was fabricated by an extrusion molding method and was polished anhydrously. After metal gallium of 70 grams and one mole per liter hydrofluoric acid of 0.5 liter are mixed (solved) in this order in 0.5 liter sulfuric acid of 2.5 mole per liter, an etchant was prepared by further solving sodium chlorate of 25 grams in the mixture solution. The glass preform rod thus polished anhydrously was dipped in the etchant while rotated, and then etched at the room temperature (20 Celsius degrees) for five minutes. The glass preform rod was subsequently rinsed with water of zero Celsius degree for about one second and washed in an acetone for about one minute in applying ultrasound, and then dried in a dry air.

No interference film was observed on the glass surface after the etching. No foreign object due to crystallization was observed on the glass surface after the etching, and no latent scratch was observed either.

Subsequently, the etched preform rod was drawn at a temperature of 475 degrees Celsius in a nitrogen atmosphere as in Example 1 or an atmosphere containing sulfur as in Example 2, and a glass fiber was obtained. No foreign object due to crystallization was observed on the surface of the obtained glass fiber, with respect to each atmosphere.

Example 6

A core-clad united body type sulfide chalcogenide glass preform rod having a clad composition of 64 mole percent $Ga_2S_3$, 3 mole percent $Ga_2O_3$, and 33 mole percent $Na_2S$ and an outer diameter of 6 millimeters, was fabricated by an extrusion molding method and was polished anhydrously. An etchant according to the invention was prepared by solving sodium chloride of 550 grams and potassium chlorate of 20 grams in this order in one liter hydrochloric acid of 0.1 mole per liter. The glass preform rod thus polished anhydrously was dipped in the etchant while rotated, and then etched at the room temperature (20 Celsius degrees) for five minutes. The glass preform rod was subsequently rinsed with water of zero Celsius degree for about one second and washed in an acetone for about one minute in applying ultrasound, and then dried in a dry air. No interference film was observed on the glass surface after the etching. No foreign object due to crystallization was observed on the glass surface after the etching, and no latent scratch was observed either.

The etched preform rod was drawn at a temperature of 550 degrees Celsius in a nitrogen atmosphere as in Example 1 or an atmosphere containing sulfur as in Example 2, and a glass fiber was obtained. No foreign object due to crystallization was observed on the surface of the obtained glass fiber, with respect to each atmosphere.

Example 7

A core-clad united body type sulfide chalcogenide glass preform rod having a clad composition of 64 mole percent $Ga_2S_3$, 32 mole percent $Na_2S$, and 4 mole percent CdS and an outer diameter of 6 millimeters, was fabricated by an extrusion molding method and was polished anhydrously. An etchant according to the invention was prepared by solving sodium chloride of 550 grams and potassium chlorate of 20 grams in this order in one liter hydrochloric acid of 0.1 mole per liter. The glass preform rod thus polished anhydrously was dipped in the etchant while rotated, and then etched at the room temperature (20Celsius degrees) for five minutes. The glass preform rod was subsequently rinsed with water of zero Celsius degree for about one second and washed in an acetone for about one minute in applying ultrasound, and then dried in a dry air. No foreign object due to crystallization was observed on the glass surface after the etching, and no latent scratch was observed either.

The etched preform rod was drawn at a temperature of 535 degrees Celsius in a nitrogen atmosphere as in Example 1 or an atmosphere containing sulfur as in Example 2, and a glass observed obtained. No foreign object due to crystallization was observed on the surface of the obtained glass fiber, with respect to each atmosphere.

Example 8

Glycerol of 50 milliliters were solved in the etchant used in Example 1 (solving sodium chloride of 550 grams and potassium chlorate of 20 grams in this order in one liter hydrochloric acid of 0.1 mole per liter) to prepare an etchant according to the invention. This etchant was slightly more viscous than the etchant in Example 1. The glass preform rod was etched using this etchant in the same manner as Example 1. No foreign object due to crystallization was observed on the glass surface after the etching, and no latent scratch was observed either.

The etched preform rod was drawn at a temperature of 545 degrees Celsius in a nitrogen atmosphere as in Example 1 or an atmosphere containing sulfur as in Example 2, and a glass fiber was obtained. No foreign object due to crystallization was observed on the surface of the obtained glass fiber, with respect to each atmosphere. The same result was also obtained from an etchant to which sodium silicate of 10 milliliters, in lieu of glycerol, was added.

Example 9

A single piece of a disc shape glass 1 having a core composition of 67 mole percent $Ga_2S_3$ and 33 mole percent $Na_2S$ (containing $Pr^{3+}$, 2000ppm), and a thickness of 1.5 millimeters with optically polished double sides of a diameter of 35 millimeters was fabricated, and three pieces of disc shape glasses 2 having a clad composition of 65 mole percent $Ga_2S_3$ and 35 mole percent $Na_2S$ (containing $Pr^{3+}$, 2000ppm), and a thickness of 10 millimeters with optically polished double sides of a diameter of 35 millimeters were fabricated.

An etchant according to the invention was prepared by solving sodium chloride of 550 grams and potassium chlorate of 20 grams in this order in one liter hydrochloric acid of 0.1 mole per liter. The respective disc shape glasses were dipped in the etchant for several seconds to etch the glasses. The disc shape glasses was subsequently rinsed with water of zero Celsius degree for about one second and washed in an acetone for about one minute in applying ultrasound, and then dried in a dry air.

The disc shape glasses were made to adhere to each other with optical contacts, and then, as shown in FIG. 1, after the glasses were placed in the cylinder 4 of the extruder and heated at 532 degrees Celsius in a nitrogen atmosphere, the glasses were pressed with a pressure of 200 bar and molded into a shape having a diameter of 6 millimeters. A part of the fabricated preform 6 was cut in a length of 6 millimeters; opposed ends and a round surface were optically polished; the cut preform was then dipped in the same etchant as above; a preform rod 7 constituted of the core and clad was obtained after rinsed and washed. Moreover, three pieces of disc shape glasses 8 having a clad composition of 66 mole percent $Ga_2S_3$ and 34 mole percent $Na_2S$, and a thickness of 10 millimeters with optically polished double sides of a diameter of 35 millimeters were fabricated, etched in the same etchant as above for several seconds, rinsed, and dried. The obtained disc shape glasses 8 were made to adhere to each other with optical contacts and placed, together with the preform rod 7 made of the core and clad, in the cylinder 4 of the extruder. The glasses were then heated at 532 degrees Celsius in a nitrogen atmosphere thereby forming a preform 11 having a diameter of 6 millimeters under a pressure of 200 bar as shown in FIG. 4. With this process, the core to clad ratio was reduced to 4 to 125, which is sufficient for making a single-mode fiber.

The obtained preform rod 11 was dipped in the same etchant as above to etch the preform at the room temperature (20 Celsius degrees) for five minutes. The glass preform rod 11 was subsequently rinsed with water of zero Celsius degree for about one second and washed in an acetone for about one minute in applying ultrasound, and then dried in a dry air.

The etched preform rod was drawn at a temperature of 545 degrees Celsius in a nitrogen atmosphere as in Example 1 or an atmosphere containing sulfur as in Example 2, and a glass fiber was obtained. No foreign object due to crystallization was observed on the surface of the obtained glass fiber, with respect to each atmosphere.

After the drawing process, transmission loss of the fiber was measured. The result was about 1 dB/m at the wavelength 1.3 micrometers. An optical amplifier was obtained in which, where a signal light of 1.3 micrometers was optically amplified using this fiber of a 6-meter length, the signal light of 0.5 milliwatt was amplified to an output light of 40 milliwatts or more upon introduction, from an end face of the fiber, of exciting light of wavelength 1.0 micrometer created by multiple semiconductor lasers of 20 milliwatts serving as exciting light sources for exciting light emitting substances in the core.

According to the invention, a single-mode fiber can be fabricated by a preform method form a metal sulfide chalcogenide glass capable of solving light emitting substances in a relatively large amount. According to the invention, etching safely removes metamorphic layers, foreign objects, latent scratches on the glass fiber starting material surfaces made of the metal sulfide chalcogenide glass, thereby drawing the glass fiber starting material into a fiber without causing surface crystallization to manufacture a glass fiber. By safe removal of metamorphic layers, foreign objects, and latent scratches by etching on the surfaces of the metal sulfide chalcogenide glass, a preform for manufacturing a glass fiber can be fabricated in which substantially no foreign object resides on the outer round surface and/or at a boundary or boundaries between the core and clad and/or between the clad and the cover glass.

In addition, a glass fiber can be provided using the metal sulfide chalcogenide glass having a mechanical strength practically durable, and a glass preform can be provided using the metal sulfide chalcogenide glass capable of manufacturing a glass fiber by a drawing method.

Moreover, this invention can provide an optical amplifier using the glass fiber. Particularly, where the light emitting substances are e.g., $Pr^{3+}$, the optical fiber amplifier according to the invention can achieve a higher optical amplification gain efficiency in comparison with a conventional amplifier. Where the light emitting substances are $Dy^{3+}$, even though $Dy^{3+}$ so far did not create an optical amplification, the invention brings an optical amplification, and the glass fiber according to the invention functions as an optical fiber amplifier.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A method for manufacturing a glass fiber comprising the steps of:
    etching a surface made of a chalcogenide glass or oxychalcogenide glass of a disc shape core forming glass starting material and a disc shape clad forming glass starting material by an etchant including an acid and a compound reacting with a hydrogen chalcogenide;
    forming the core forming glass starting material and the clad forming glass starting material into a united body; and
    heating and drawing the united body into the glass fiber.

2. A method for manufacturing a glass fiber comprising the steps of:
    etching a surface made of a chalcogenide glass or oxychalcogenide glass of a rod shape glass, which is made of a core forming glass and a clad forming glass, and either a disc shape clad forming glass starting material or a cover layer forming glass starting material, by an etchant including an acid and a compound reacting with a hydrogen chalcogenide;
    forming the rod shape glass and either the disc shape clad forming glass starting material or the cover layer forming glass starting material into a united body, and
    heating and drawing the united body into the glass fiber.

3. The method for manufacturing a glass fiber according to claim 1, wherein the glass fiber is drawn in an atmosphere containing sulfur, in which the sulfur concentration is controlled at a sulfur vapor pressure or above around a glass surface at a maximum temperature while the glass fiber is drawn.

4. The method for manufacturing glass fiber according to claim 1 wherein the core forming glass starting material is made of the chalcogenide glass or oxychalcogenide glass and includes a light emitting substance.

5. The method for manufacturing a glass fiber according to claim 2, wherein the glass fiber is drawn in an atmosphere containing sulfur, in which the sulfur concentration is controlled at a sulfur vapor pressure or above around a glass surface at a maximum temperature while the glass fiber is drawn.

6. The method for manufacturing glass fiber according to claim 2, wherein the core forming glass is made of the chalcogenide glass or oxychalcogenide glass and includes a light emitting substance.

7. A method for manufacturing a glass fiber comprising drawing a glass preform into a glass fiber, wherein the preform comprises a core forming glass and a clad forming glass; at least one of the glasses is made of a chalcogenide glass or oxychalcogenide glass; and the glass preform substantially has no foreign object caused by crystallization at a boundary between the core forming glass and the clad forming glass and on an outer round surface of the preform, wherein one or more among the outer round surface of the preform, a surface of a starting material of the clad forming glass and a surface of a starting material of the core forming glass is etched by an etchant including an acid and a compound reacting with a hydrogen chalcogenide.

8. The method for manufacturing a glass fiber according to claim 7, wherein the preform further comprises a cover layer forming glass, at least one of the glasses is made of a chalcogenide glass or oxychalcogenide glass, and the glass preform substantially has no foreign object caused by crystallization at a boundary between the clad forming glass and the cover layer forming glass.

9. The method for manufacturing a glass fiber according to claim 7, wherein the glass fiber is drawn in an atmosphere containing sulfur, in which the sulfur concentration is controlled at a sulfur vapor pressure or above around a glass surface at a maximum temperature while the glass fiber is drawn.

10. The method for manufacturing glass fiber according to claim 7 wherein the core forming glass is made of the chalcogenide glass or oxychalcogenide glass and includes a light emitting substance.

11. The method for manufacturing a glass fiber according to claim 8, wherein the glass fiber is drawn in an atmosphere containing sulfur, in which the sulfur concentration is controlled at a sulfur vapor pressure or above around a glass surface at a maximum temperature while the glass fiber is drawn.

12. The method for manufacturing glass fiber according to claim 8, wherein the core forming glass or the core forming glass starting material is made of the chalcogenide glass or oxychalcogenide glass and includes a light emitting substance.

13. A method for manufacturing a glass fiber comprising the steps of:
    preparing a glass preform including a core forming glass and a clad forming glass, the glass preform having an outer round surface made of a chalcogenide glass or oxychalcogenide glass;
    etching the outer round surface of the glass preform by an etchant including an acid and a compound reacting with a hydrogen chalcogenide; and
    heating and drawing the glass preform into the glass fiber.

14. The method for manufacturing a glass fiber according to claim 13, wherein the glass preform is manufactured by the steps of etching a surface made of a chalcogenide glass or oxychalcogenide glass of disc shape core and clad forming glass starting materials by an etchant including an acid and a compound reacting with a hydrogen chalcogenide, and forming the core forming glass starting material and the clad forming glass starting material into a united body serving as the glass preform.

15. The method for manufacturing a glass fiber according to claim 13, wherein the glass preform is manufactured by the steps of etching a surface made of a chalcogenide glass or oxychalcogenide glass of a rod shape glass, which is made of a core forming glass and a clad forming glass, and either a disc shape clad forming glass starting material or a cover layer forming glass starting material by an etchant including all acid and a compound reacting with a hydrogen chalcogenide, and forming the rod shape glass and either the clad forming glass starting material or the cover layer forming glass starting material into the united body serving as the glass preform.

16. The method for manufacturing a glass fiber according to claim 13, wherein the preform substantially has no foreign object caused by crystallization at a boundary between the core forming glass and the clad forming glass and on an outer round surface of the preform.

17. The method for manufacturing a glass fiber according to claim 16, wherein the preform further comprises a cover layer forming glass, at least one of the glasses is made of a chalcogenide glass or oxychalcogenide glass, and the glass preform substantially has no foreign object caused by crystallization at a boundary between the clad forming glass and the cover layer forming glass.

18. A method for manufacturing a glass fiber comprising the steps of:
preparing a solid rod and a solid tube in which at least one of an outer round surface of the rod, an inner round surface of the tube, and an outer round surface of the tube is, made of a chalcogenide glass or oxychalcogenide glass;
etching one or more round surfaces made of the chalcogenide glass or oxychalcogenide glass among the outer round surface of the rod, the inner round surface of the tube, and the outer round surface of the tube by an etchant including an acid and a compound reacting with a hydrogen chalcogenide;
placing the rod in a hollow of the tube; and
heating and drawing the rod and the tube into the glass fiber.

19. The method for manufacturing a glass fiber according to claim 18, wherein the rod is made of a core forming glass starting material, and the tube is made of a clad forming glass starting material.

20. The method for manufacturing a glass fiber according to claim 18, wherein the rod is a preform made of a core forming glass and a clad forming glass, and the tube is a jacketing tube made of a tube cover layer forming glass starting material.

21. The method for manufacturing a glass fiber according to claim 20, wherein the preform is manufactured by the steps of etching a surface made of a chalcogenide glass or oxychalcogenide glass of disc shape core and clad forming glass starting materials by an etchant including an acid and a compound reacting with a hydrogen chalcogenide, and forming the core forming glass starting material and the clad forming glass starting material into a united body serving as the preform.

22. The method for manufacturing a glass fiber according to claim 20, wherein the glass preform is manufactured by the steps of etching a surface made of a chalcogenide glass or oxychalcogenide glass of a rod shape glass, which is made of a core forming glass and a clad forming glass, and either a disc shape clad forming glass starting material or a cover layer forming glass starting material by an etchant including an acid and a compound reacting with a hydrogen chalcogenide, and forming the rod shape glass and either the clad forming glass starting material or the cover layer forming glass starting material into the united body serving as the glass preform.

23. The method for manufacturing a glass fiber according to claim 20, wherein the preform substantially has no foreign object caused by crystallization at a boundary between the core forming glass and the clad forming glass and on an outer round surface of the preform.

24. The method for manufacturing a glass fiber according to claim 23, wherein the preform further comprises a preform cover layer forming glass, at least one of the preform cover layer forming glass, the clad forming glass and the tube cover layer forming glass is made of a chalcogenide glass or oxychalcogenide glass, and the glass preform substantially has no foreign object caused by crystallization at a boundary between the clad forming glass and the preform cover layer forming glass.

25. The method for manufacturing a glass fiber according to claim 13, wherein the glass fiber is drawn in an atmosphere containing sulfur, in which the sulfur concentration is controlled at a sulfur vapor pressure or above around a glass surface at a maximum temperature while the glass fiber is drawn.

26. The method for manufacturing glass fiber according to claim 13, wherein the core forming glass or the core forming glass starting material is made of the chalcogenide glass or oxychalcogenide glass and includes a light emitting substance.

27. The method for manufacturing a glass fiber according to claim 18, wherein the glass fiber is drawn in an atmosphere containing sulfur, in which the sulfur concentration is controlled at a sulfur vapor pressure or above around a glass surface at a maximum temperature while the glass fiber is drawn.

28. A method for manufacturing a glass fiber comprising the steps of:
preparing a solid glass rod and a solid tube in which at least one of an outer round surface of the rod, an inner round surface of the tube, and an outer round surface of the tube is made of a chalcogenide glass or oxychalcogenide glass;
etching one or more round surfaces made of the chalcogenide glass or oxychalcogenide glass among the outer round surface of the rod, the inner round surface of the tube, and the outer round surface of the tube by an etchant including an acid and a compound reacting with a hydrogen chalcogenide;
placing the rod in a hollow of the tube;
softening the rod and the tube by heating the rod and the tube to a temperature at which the glass rod viscosity is $10^5$ to $10^{7.5}$ poises; and
drawing the rod and the tube into the glass fiber.

29. The method for manufacturing a glass fiber according to claim 28, wherein the rod is a preform made of a core forming glass and a clad forming glass, and the tube is a jacketing tube made of a tube cover layer forming glass starting material.

30. The method for manufacturing a glass fiber according to claim 29, wherein the preform is manufactured by the steps of etching a surface made of chalcogenide glass or oxychalcogenide glass of disc shape core and clad forming glass starting materials by an etchant including an acid and a compound reacting with a hydrogen chalcogenide, and forming the core forming glass starting material and the clad forming glass starting material into a united body serving as the preform.

31. The method for manufacturing a glass fiber according to claim 29, wherein the glass preform is manufactured by the steps of etching a surface made of a chalcogenide glass or oxychalcogenide glass of a rod shape glass, which is made of a core forming glass and a clad forming glass, and either a disc shape clad forming glass starting material or a cover layer forming glass starting material by an etchant including an acid and a compound reacting with hydrogen chalcogenide, and forming the rod shape glass and either the clad forming forming glass starting material or the cover layer forming glass starting material into the united body serving as the glass preform.

32. The method for manufacturing a glass fiber according to claim 29, wherein the preform substantially has no foreign object caused by crystallization at a boundary between the core forming glass and the clad forming glass and an outer round surface of the preform.

33. The method for manufacturing a glass fiber according to claim 32, wherein the preform further comprises a preform cover layer forming glass, at least one of the preform cover layer forming glass, the clad forming glass and the tube cover layer forming glass is made of a chalcogenide glass or oxychalcogenide glass, and the glass preform substantially has no foreign object caused by crystallization at a boundary between the clad forming glass and the preform cover layer forming glass.

34. The method for manufacturing a glass fiber according to claim 28, wherein the glass fiber is drawn in an atmosphere containing sulfur, in which the sulfur concentration is controlled at a sulfur vapor pressure or above around a glass surface at a maximum temperature while the glass fiber is drawn.

* * * * *